United States Patent
Zheng et al.

(10) Patent No.: US 7,118,506 B2
(45) Date of Patent: Oct. 10, 2006

(54) ACTUATOR FOR ACTIVE FRONT STEERING SYSTEM

(75) Inventors: Bing Zheng, Dublin, OH (US); John Balint, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 180 days.

(21) Appl. No.: 10/913,179

(22) Filed: Aug. 6, 2004

(65) Prior Publication Data

US 2006/0030445 A1  Feb. 9, 2006

(51) Int. Cl.
- B62D 11/06 (2006.01)
- B62D 11/24 (2006.01)
- B62D 3/00 (2006.01)
- H02K 7/06 (2006.01)

(52) U.S. Cl. .................... 475/18; 475/30; 180/6.28; 180/6.38; 310/83

(58) Field of Classification Search ........... 475/18, 475/19, 26, 30; 180/6.2, 6.24, 6.28, 6.38, 180/6.48, 6.5, 65.7
See application file for complete search history.

(56) References Cited

U.S. PATENT DOCUMENTS

| | | | |
|---|---|---|---|
| 613,894 A * | 11/1898 | Vaughan-Sherrin | 310/115 |
| 3,172,299 A | 3/1965 | Musser | |
| 3,453,510 A * | 7/1969 | Kreuter et al. | 318/674 |
| 3,897,843 A * | 8/1975 | Hapeman et al. | 180/65.5 |
| 4,274,023 A * | 6/1981 | Lamprey | 310/83 |
| 4,566,353 A | 1/1986 | Stiff | |
| 4,656,409 A * | 4/1987 | Shimizu | 318/689 |
| 4,660,669 A * | 4/1987 | Shimizu | 180/444 |
| 4,751,976 A | 6/1988 | Higuchi et al. | |
| 4,918,344 A * | 4/1990 | Chikamori et al. | 310/83 |
| 5,123,300 A | 6/1992 | Himmelein et al. | |
| 5,246,082 A * | 9/1993 | Alber | 180/65.5 |
| 5,593,360 A * | 1/1997 | Ishida et al. | 475/331 |
| 5,595,089 A * | 1/1997 | Watanabe et al. | 74/89.34 |
| 5,631,511 A * | 5/1997 | Schulmann et al. | 310/83 |
| 5,906,250 A | 5/1999 | Haga et al. | |
| 6,012,347 A | 1/2000 | Hasegawa | |
| 6,129,061 A * | 10/2000 | Okuda et al. | 123/90.17 |
| 6,164,150 A | 12/2000 | Shindo et al. | |
| 6,199,654 B1 | 3/2001 | Kojo et al. | |
| 6,749,532 B1 * | 6/2004 | Wachauer | 475/5 |
| 6,798,104 B1 * | 9/2004 | Kajiura et al. | 310/162 |
| 6,838,790 B1 * | 1/2005 | Arimitsu et al. | 310/43 |
| 6,974,399 B1 * | 12/2005 | Lo | 475/5 |
| 7,004,281 B1 * | 2/2006 | Hidaka | 180/446 |
| 7,014,586 B1 * | 3/2006 | Randall | 475/2 |
| 2003/0178242 A1 | 9/2003 | Yamamori et al. | |

FOREIGN PATENT DOCUMENTS

JP   1164843   6/1989

* cited by examiner

*Primary Examiner*—Tisha Lewis
(74) *Attorney, Agent, or Firm*—Brinks Hofer Gilson & Lione

(57) ABSTRACT

A active steering apparatus includes a housing, an input shaft, an output shaft, and an electrical motor. The electric motor has a stator fixed to the housing and a rotor. A first gear set interconnects the input shaft and the output shaft and includes a sun gear fixed to an end of the input shaft, a ring gear fixed to the output shaft, and a plurality of planet gears positioned between and interconnecting the ring gear and the sun gear. A second gear set is mounted onto the rotor and interconnects the ring gear and the housing such that rotation of the rotor relative to the housing imparts movement of the ring gear relative to the housing.

13 Claims, 3 Drawing Sheets

ACTUATOR FOR ACTIVE FRONT STEERING SYSTEM

BACKGROUND

1. Field of the Invention

The present invention relates generally to a steering actuator that provides electric power assisted steering and active front steering in a motor vehicle as well as the ability to provide the functionality of a traditional steering shaft.

2. Description of Related Technology

In many vehicles today, power steering is accomplished through the use of an electric motor mounted onto the steering shaft such that the electric motor selectively provides assistance to the rotation of the steering shaft. In some circumstances such as active front steering, it may be desirable to accommodate both an electrical power assisted steering system and allow a relative rotation between input shaft and output shaft of steering column. Therefore, there is a need for a steering system that can provide electrical power assisted steering and active steering capability.

SUMMARY

A active steering apparatus incorporating the features of the present application includes a housing, and input shaft, an output shaft, and an electric motor. Interconnecting the input shaft and the output shaft is a planetary gear set. The planetary gear set includes a sun gear fixed to an end of the input shaft, a ring gear, and a plurality of planet gears interconnecting the ring gear and the sun gear. The electric motor includes a stator, fixed to the housing, and a rotor. A gear set mounted onto the rotor interconnects the ring gear and the housing such that rotation of the rotor relative to the housing imparts movement of the ring gear relative to the housing.

In an embodiment the gear set is a planetary gear set having a plurality of planet gears rotatably mounted onto the rotor, wherein the planet gears engage the ring gear and the fixed ring gear.

In another embodiment the gear set comprises a flexspline and an elliptical cam, wherein the elliptical cam is mounted onto the rotor and inserted within the flexspline.

DESCRIPTION OF THE DRAWINGS

The above, as well as other advantages will become readily apparent to those skilled in the art from the following detailed description of the embodiments when considered in the light of the accompanying drawings in which.

DESCRIPTION OF THE EMBODIMENTS

Figure 1:
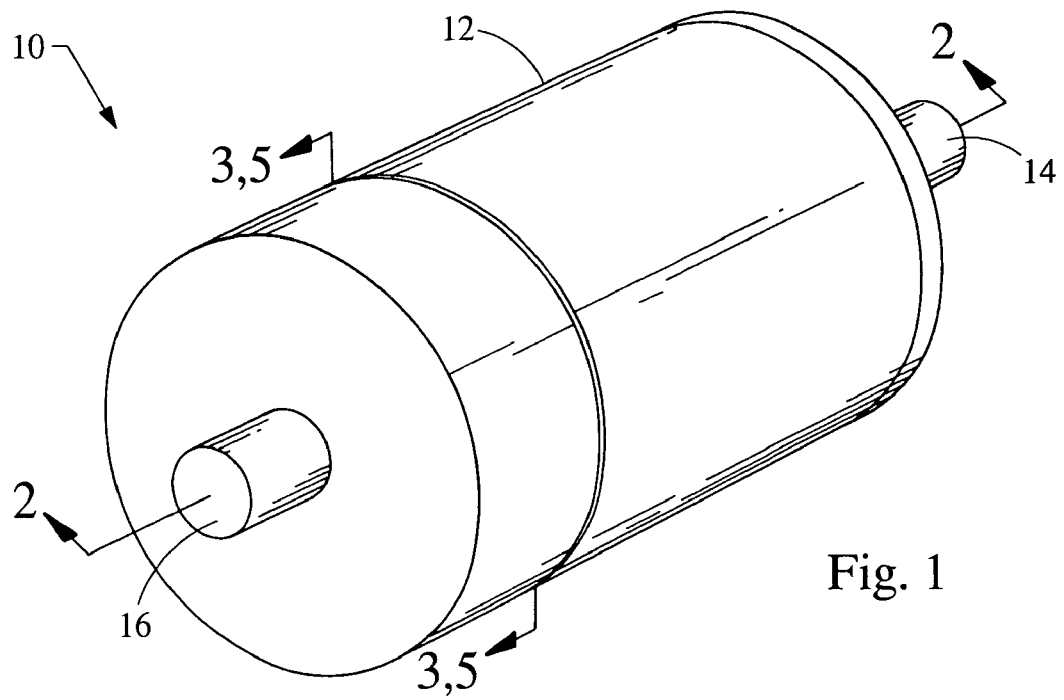
FIG. 1 is a side sectional view of a active steering apparatus.
Figure 2:
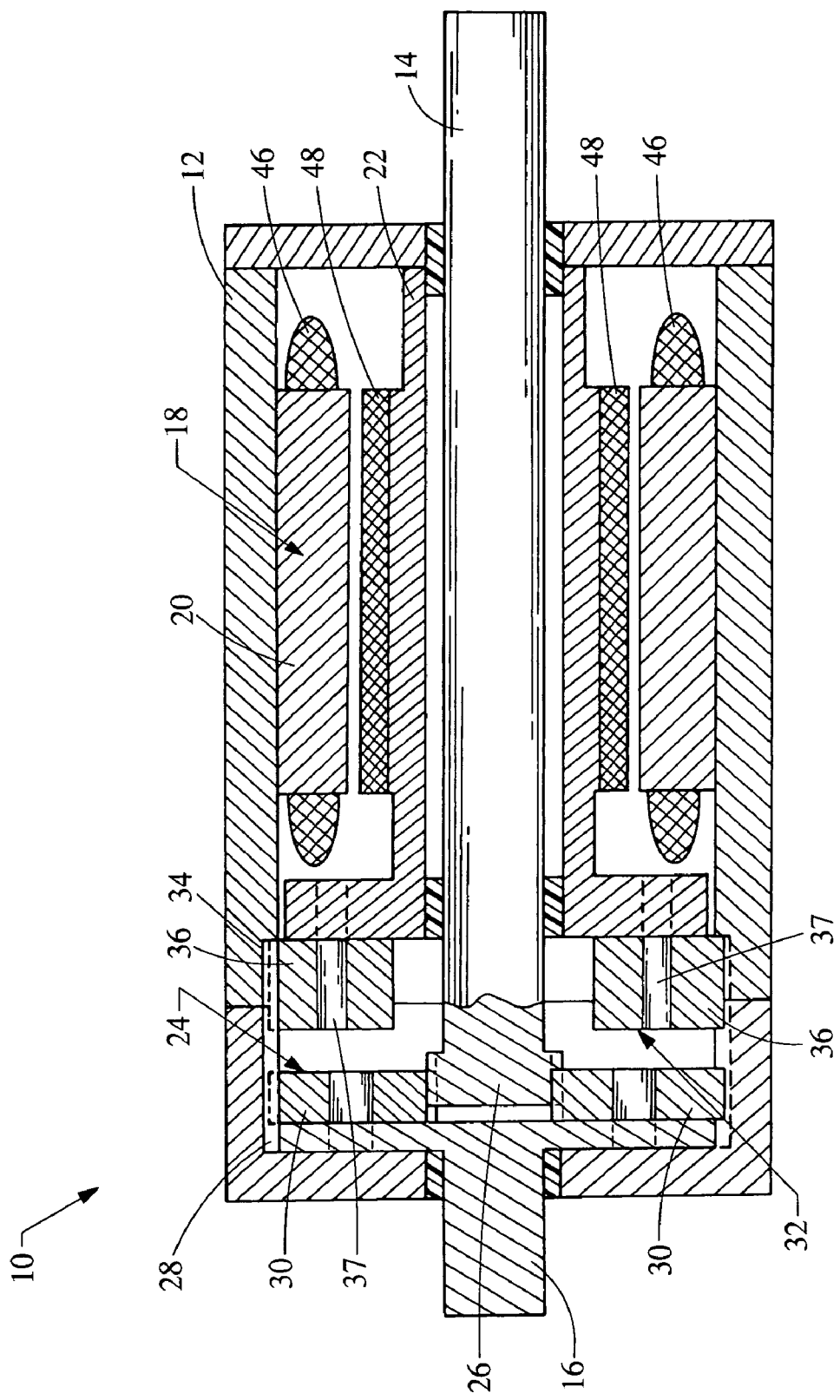
FIG. 2 is a sectional view taken along line 2—2 of FIG. 1.

Referring to FIGS. 1 and 2, a active steering apparatus embodying the principles of the present invention is shown generally at 10. Principally, the active steering apparatus 10 includes a housing 12, an input shaft 14, an output shaft 16, and electric motor 18, a first gear set 24, and a second gear set 32.

The housing 12 is stationarily mounted to an appropriate support within a motor vehicle engine compartment. The input shaft 14 is connected to a driver interface, such as a steering wheel, and the output shaft 16 connects to a steering assembly of the motor vehicle. Accordingly, the driver supplies input to the active steering apparatus 10 through the input shaft 14 and that input is routed through the active steering apparatus 10 to the wheels of the vehicle, through the output shaft 16.

The electric motor 18 is mounted within the housing 12 and includes a stator 20, fixedly mounted to the housing 12, and a rotor 22. Preferably, the electric motor 18 is a hollow brushless DC motor having coils 46 on the stator 20 and permanent magnets 48 mounted onto the rotor 22.

The first gear set 24 is a planetary gear set that interconnects the input shaft 14 and the output shaft 16. The planetary gear set 24 includes a sun gear 26 fixed to, or unitarily formed on, an end of the input shaft 14 located therein. A ring gear 28 is fixed to the output shaft 16. A plurality of planet gears 30 are positioned between and interconnect the ring gear 28 and the sun gear 26.

The planetary gear set 24 as shown includes three planet gears 30, however, any appropriate number of planet gears 30 could be incorporated without departing from the scope of the invention as claimed. Each of the planet gears 30 includes a number of gear teeth ($N_p$) formed thereon. The sun gear 26 and the ring gear 28 each also have a number of gear teeth ($N_s$ and $N_r$ respectively) formed thereon. The ring gear 28, the sun gear 26, and the planet gears 30 are designed such that the number of gear teeth on the ring gear 28 equals the number of gear teeth on the sun gear 26 plus twice the number of gear teeth on one of the planet gears 30, ($N_r = N_s + 2N_p$). Furthermore, the sum of the number of gear teeth on the ring gear 28 and the number of teeth on the sun gear 26 divided by three must be a whole number integer, or, ($N_r + N_s$)/3=an integer.

The second gear set 32 is mounted onto the rotor 22 and interconnects the ring gear 28 and the housing 12 such that rotation of the rotor 22 relative to the housing 12 imparts movement of the ring gear 28 relative to the housing 12. The housing 12 includes a fixed ring gear 34 formed thereon. The fixed ring gear 34 includes a number of gear teeth ($N_f$) formed therein. The gear set 32 engages the gear teeth of both the ring gear 28 and the fixed ring gear 34, thereby interconnecting the ring gear 28 and the fixed ring gear 34.

To facilitate the movement of the ring gear 28 relative to the fixed ring gear 34 and the housing 12, the ring gear 28 and the fixed ring gear 34 have different numbers of gear teeth. Preferably, the fixed ring gear 34 has more teeth than the ring gear 28. As shown, the fixed ring gear 34 has two more teeth than the ring gear 28, or $N_f = N_r + 2$. This will cause the ring gear 28 to rotate at a different speed than the fixed ring gear 34 as the gear set 32 moves around each of them.

Figures 3, 5:
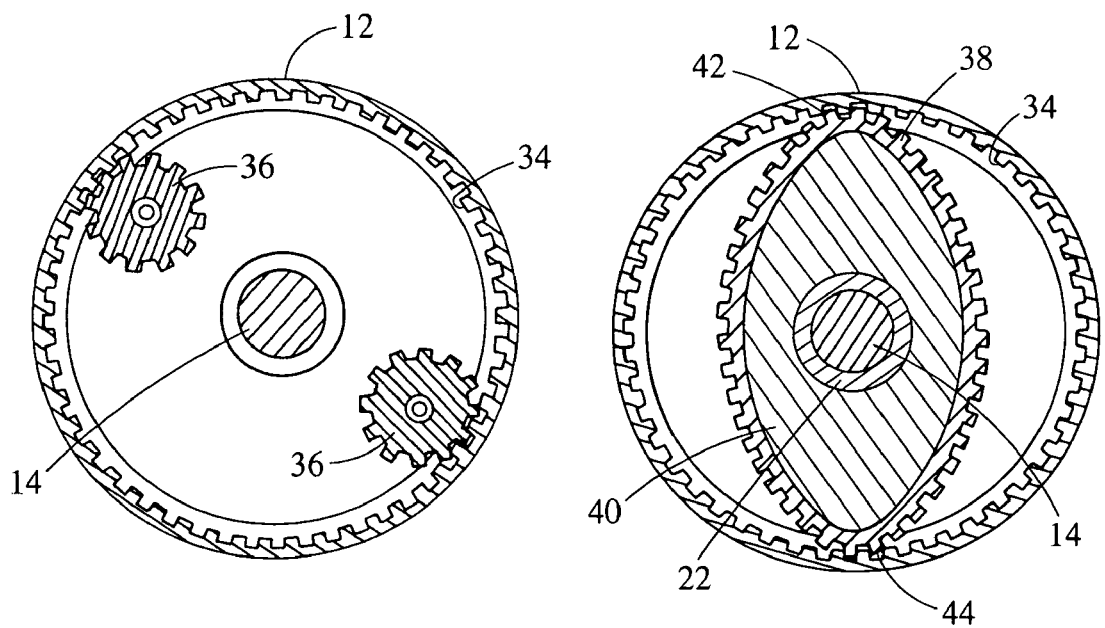
FIG. 3 is a side sectional view of an alternative embodiment of the active steering apparatus.
FIG. 5 is a side sectional view showing the elliptical cam of the embodiment of FIG. 4.

As shown in FIG. 2, the gear set 32 is a planetary gear set having a plurality of planet gears 36. The planet gears 36 are rotatably mounted with the rotor 22 via pins 37 and engage both the rotatable ring gear 28, of the first gear set 24, and the fixed ring gear 34, formed integrally with the housing 12, as shown in FIG. 3.

When the electric motor 18 is not activated, the second gear set 32 keeps the housing 12 and the ring gear 28 locked to one another, since the stator 20 and the rotor 22 are not moving relative to one another. In this circumstance, the planetary gear set 24 has a rotationally fixed ring gear 28 and will provide a fixed steering ratio based on the number of gear teeth on the ring gear 28 and the sun gear 26. The ratio between the input shaft 14 and the output shaft 16, when the electric motor 18 is not activated, is $R=1+N_r/N_s$. Thus rotation of the input shaft 14 causes rotation of the sun gear 26. The sun gear 26 in turn causes rotation of the planet gears 30, that also engage the non-rotating ring gear 28, causing them to rotate about the sun gear 26. Via the pins 37, the planet gears induce rotation of the output shaft 16.

When the electric motor 18 is activated, the rotor 22 will rotate relative to the housing 12. This causes the planet gears 36 to rotate around the ring gear 28 and the fixed ring gear 34. Because of the difference in the number of gear teeth on the ring gear 28 and the fixed ring gear 34, the ring gear 28 will rotate relative to the housing 12 and the rotor 22. The rotation of the ring gear 28 will in turn cause the ratio between the input shaft 14 and the output shaft 16 to change through the planetary gear set 24. By controlling the speed of the electric motor 18, the ratio between the input shaft 14 and the output shaft 16 can be varied and controlled.

Figure 4:
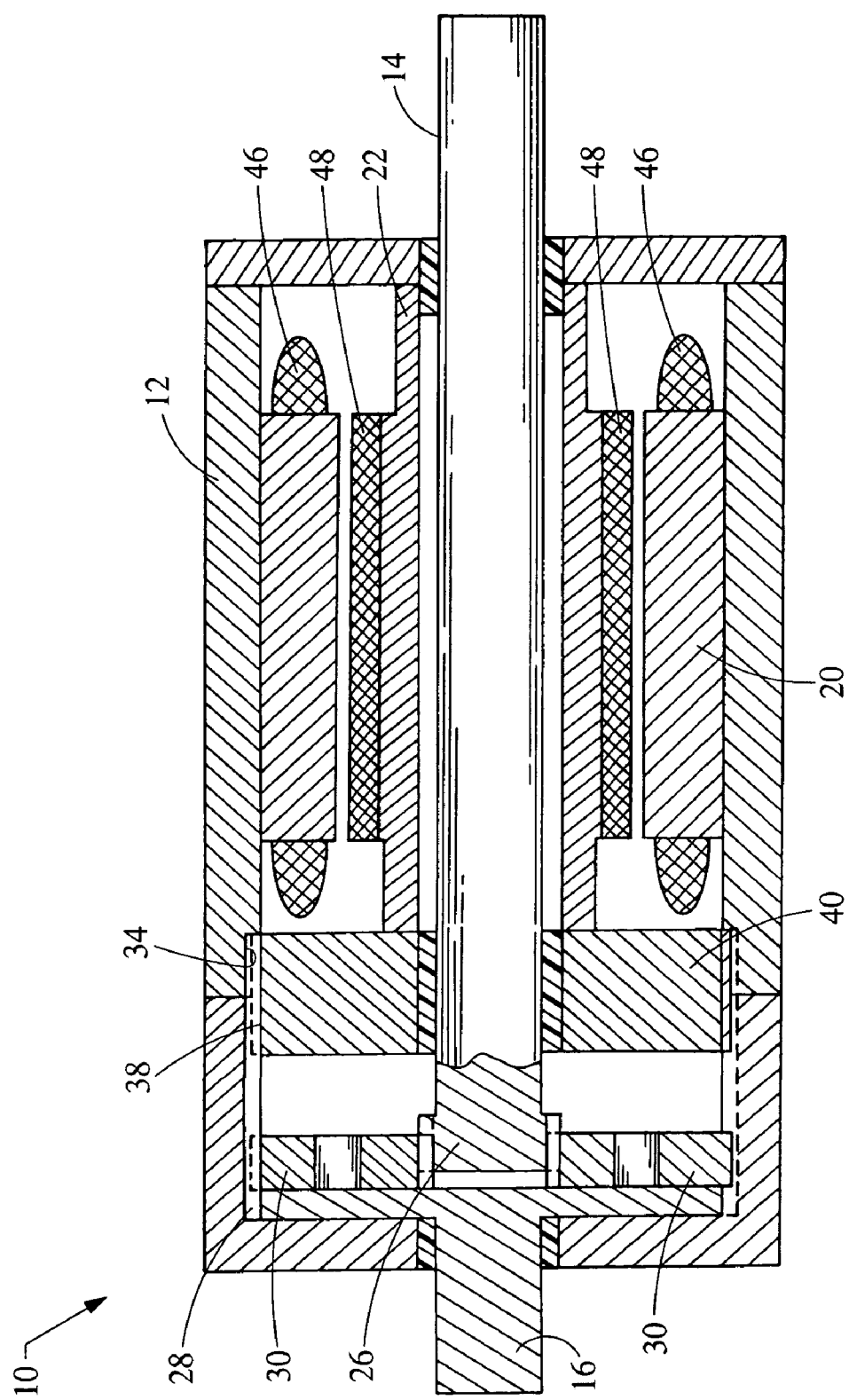
FIG. 4 is a sectional view of the embodiment of FIG. 3, similar to that seen in FIG. 2.

In another embodiment, shown in FIG. 4, the second gear set 32 comprises a flexspline 38 and an elliptical cam 40. The flexspline 38 is a thin walled, flexible steel cylinder with external gear teeth formed thereon. The elliptical cam 40 is fixedly mounted onto the rotor 22 and inserted within the flexspline 38. The gear teeth on the flexspline 38 engage the gear teeth of the ring gear 28 and the fixed ring gear 34.

The elliptical cam 40 is shaped such that the gear teeth of the flexspline 38 engage both the gear teeth of the ring gear 28 and the fixed ring gear 34 at two diametrically opposed positions 42, 44, as shown in FIG. 5. The flexspline 38 has the same number of gear teeth ($N_{fs}$) as the ring gear 28, such that $N_{fs}=N_r$. However, similarly to the embodiment shown in FIG. 2, the ring gear 28 has two more gear teeth than the fixed ring gear 34.

When the electric motor 18 is not activated, the flexspline 38 will keep the housing 12 and the fixed ring gear 34 locked to the ring gear 28. In this circumstance, the planetary gear set 24 has a rotationally fixed ring gear 28 and will provide a fixed steering ratio to the output shaft 16, relative to the number of gear teeth on the ring gear 28 and the sun gear 26. The ratio between the input shaft 14 and the output shaft 16 when the electric motor 18 is not activated is $R=1+N_r/N_s$.

When the electric motor 18 is activated, the rotor 22 will rotate relative to the housing 12. This causes the elliptical cam 40 to rotate, thereby moving the contact points 42, 44 around the ring gear 28 and the fixed ring gear 34. Because of the engagement of the gear teeth of the flexspline 38 and the difference in the number of gear teeth on the ring gear 28 and the fixed ring gear 34, the ring gear 28 will rotate relative to the housing 12 and the rotor 22. The rotation of the ring gear 28 will in turn cause the ratio between the input shaft 14 and the output shaft 16 to change through the planetary gear set 24. By controlling the speed of the electric motor 18, the steering ratio between the input shaft 14 and the output shaft 16 can be varied.

In accordance with the provisions of the patent statutes, the features of the present application have been described in various specific embodiments. However, it should be noted that the features of the present application can be practiced otherwise than as specifically illustrated and described herein.

What is claimed is:

1. A active steering apparatus comprising:
   an input shaft;
   an output shaft;
   a housing;
   an electrical motor located within said housing, said electric motor having a stator fixed to said housing and a rotor rotatable mounted within said housing;
   a first gear set interconnecting said input shaft and said output shaft, said first gear set including a sun gear fixed to an end of said input shaft, a ring gear fixed to said output shaft, and a plurality of planet gears positioned between and interconnecting said ring gear and said sun gear;
   a second gear set mounted onto said rotor, said second gear set interconnecting said ring gear and said housing such that rotation of said rotor relative to said housing imparts movement of said ring gear relative to said housing.

2. The active steering apparatus of claim 1 wherein said ring gear includes a plurality, $N_r$, of gear teeth formed thereon and said housing includes a fixed ring gear formed therein having a plurality, $N_f$, of gear teeth, said gear set engaging said gear teeth of said ring gear and said fixed ring gear, thereby interconnecting said ring gear and said fixed ring gear.

3. The active steering apparatus of claim 2 wherein said fixed ring gear has more gear teeth formed therein than said ring gear.

4. The active steering apparatus of claim 3 wherein $N_f=N_r+2$.

5. The active steering apparatus of claim 4 wherein said first gear set includes three planet gears.

6. The active steering apparatus of claim 5 wherein each of said planet gears includes a plurality, $N_p$, of gear teeth and said sun gear includes a plurality, $N_s$, of gear teeth, wherein $N_r=N_s+2N_p$.

7. The active steering apparatus of claim 6 wherein $(N_r+N_s)/3$ is an integer.

8. The active steering apparatus of claim 7 wherein said second gear set includes a plurality of planet gears rotatably mounted with said rotor, said planet gears engaging said ring gear and said fixed ring gear.

9. The active steering apparatus of claim 7 wherein said gear set comprises a flexspline and an elliptical cam, said elliptical cam being rotatably mounted with said rotor and inserted within said flexspline.

10. The active steering apparatus of claim 9 wherein said flexspline includes a plurality, $N_{fs}$, of gear teeth formed therein, said gear teeth of said flexspline engaging said gear teeth of both said ring gear and said fixed ring gear.

11. The active steering apparatus of claim 10 wherein $N_{fs}=N_r$.

12. The active steering apparatus of claim 11 wherein said elliptical cam is shaped such that the gear teeth of said flexspline engage the gear teeth of both said ring gear and said fixed ring gear at two positions located one hundred and eighty degrees apart.

13. The active steering apparatus of claim 7 wherein said electric motor is a hollow brushless DC motor having coils on said stator and permanent magnets mounted onto said rotor.

* * * * *